No. 680,481. Patented Aug. 13, 1901.
L. FURMAN.
ROPE CLAMP.
(Application filed Apr. 22, 1901.)
(No Model.)
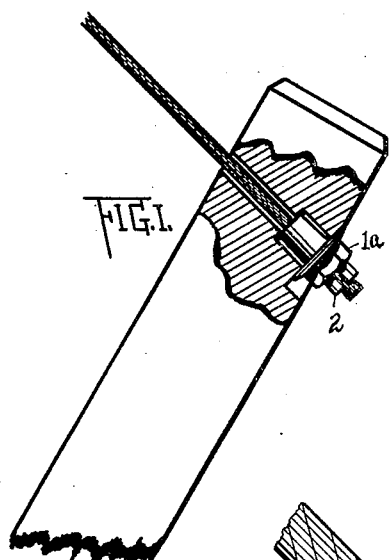
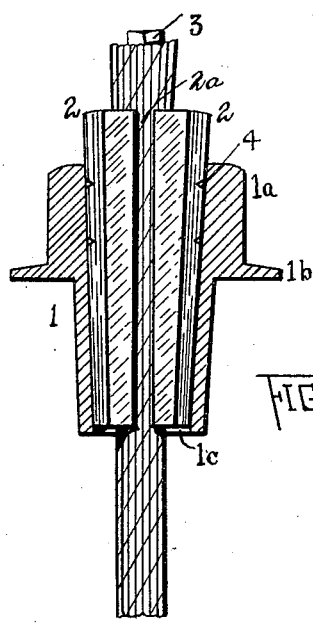
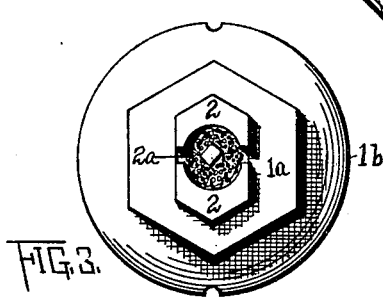
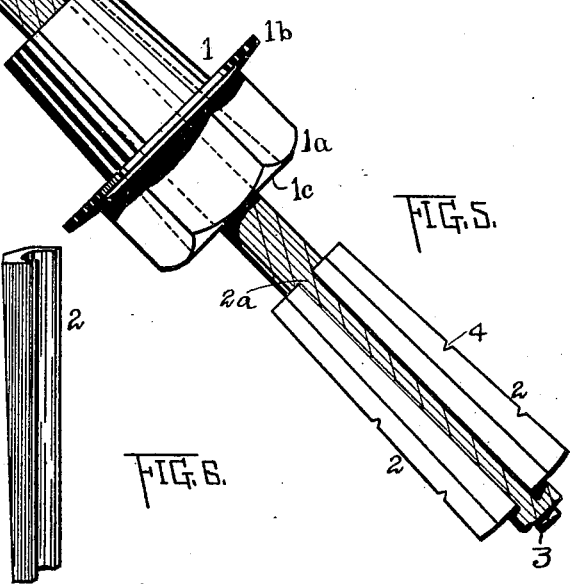
WITNESSES:
Jas. C. Hanson.
INVENTOR.
Lemuel Furman
BY
Geo. B. Willcox ATTORNEY.

UNITED STATES PATENT OFFICE.

LEMUEL FURMAN, OF BAY CITY, MICHIGAN, ASSIGNOR OF ONE-HALF TO CHARLES GLAVE, OF SAME PLACE.

ROPE-CLAMP.

SPECIFICATION forming part of Letters Patent No. 680,481, dated August 13, 1901.

Application filed April 22, 1901. Serial No. 56,930. (No model.)

*To all whom it may concern:*

Be it known that I, LEMUEL FURMAN, a citizen of the United States, residing at Bay City, in the county of Bay and State of Michigan, have invented certain new and useful Improvements in Rope-Clamps; and I do hereby declare the following to be a full, clear, and exact description of the invention, such as will enable others skilled in the art to which it appertains to make and use the same.

This invention relates to new and useful improvements in rope-sockets, consisting in certain means whereby I produce a rope-socket that not only clamps the rope, but is adapted to tighten it by twisting; and it consists, further, in certain details of construction for purposes to be set forth.

The clamp is illustrated in the accompanying drawings, in which—

Figure 1 is a part sectional view of a guy-post with the clamp attached. Fig. 2 is a part sectional view of the clamp. Fig. 3 is a top view. Fig. 4 is a bottom view. Fig. 5 shows the parts of the clamp detached, and Fig. 6 is a perspective view of a key.

As is clearly shown in the drawings, the device consists in an outer tubular shell 1 and two tapered clamping-keys 2. The upper end of the tubular shell is made in the form of a square or hexagonal nut $1^a$ and has a laterally-projecting flange $1^b$. The remaining portion of the shell is circular in cross-section. Extending longitudinally throughout the length of the shell 1 is a tapered slot having parallel sides, the edges of said slot being formed by V-shaped grooves $1^c$, which are of the same cross-section throughout their length, but converge toward each other from the head to the opposite end of the shell 1. The keys 2, which are duplicates, are cylindrically concaved lengthwise their inner faces, and their outer faces slide lengthwise the slot and fit the V-shaped grooves $1^c$.

The rope to be clamped is placed between the keys 2, which partially surround it by their concaved inner faces. The keys are then slid into the slot of the shell 1, their sides fitting the sides of the slot and their tapered V-shaped outer faces sliding in the V-shaped grooves of the slot. The tapered keys thus have a uniform bearing throughout their length both upon the V-shaped grooves of the shell and also upon the rope. The farther they are drawn into the shell by the pull of the rope the tighter they clamp it. The adjacent edges of the two keys are separated by a clearance-space $2^a$, so that the same pair of clamps will suit ropes of different sizes. Since the sizes of the keys 2 are straight and parallel, corresponding to the straight parallel sides of the slot, it is impossible for either key to rotate and bind either against the adjacent edge of the other key or against the sides of the slot, as would be the case if the keys were made of semicylindrical section. By my construction the only movements permitted the keys are a longitudinal sliding movement along the slot and the clamping movement toward or from each other as they move into or out from the slot $1^c$. Notches 4 in the outer edges of the keys are provided to facilitate removal of the keys by prying with a chisel or similar tool. When it is desired to tighten the rope, the clamp being secured to a post or other support, as in Fig. 1, it is only necessary to rotate the clamp axially in its seat in the post by means of the head $1^a$, thus twisting the rope and shortening it. The flange $1^b$ prevents the shell from pulling through the opening in the support and affords ample bearing-surface. By its friction upon the support it prevents the rope from untwisting; but to assure additional safety against untwisting I provide one or more openings $1^d$ through the flange for nailing or screwing it to the support. To secure the ends of a rope by means of this clamp, the rope is preferably cut off near the clamp and a tapered metal pin or key 3 is driven into the end of the rope between the keys 2, as shown in Figs. 2 and 5.

By the means above described I have produced a rope clamp and tightener that is simple in construction, having only three parts, none of which necessitate drilling or other machine-work. The same pair of keys will clamp various sizes of rope, and when in place they cannot turn so as to interfere with each other.

What I claim as my invention, and desire to secure by Letters Patent, is—

1. A rope-clamp comprising in combination a polygonal nut having a flange at its base and having a cylindrical shell projecting below the flange; an opening extending through said nut and shell, having two flat parallel sides of decreasing width, and two converging sides of substantially V-section; a pair of tapered keys having inner faces cylindrically concaved and outer faces of V-section adapted to slidably engage the converging sides of the opening.

2. A rope-clamp comprising in combination a polygonal nut having a flange at its base provided with openings 1$^d$ and having a cylindrical shell projecting below the flange; an opening extending through said nut and shell, having two flat parallel sides of decreasing width, and two converging sides of substantially V-section; a pair of tapered keys having inner faces cylindrically concaved and outer faces of V-section adapted to slidably engage the converging sides of the opening.

In testimony whereof I affix my signature in presence of two witnesses.

LEMUEL FURMAN.

Witnesses:
  I. GOULD,
  GEO. B. WILLCOX.